United States Patent Office 3,246,025
Patented Apr. 12, 1966

3,246,025
MERCAPTOPROPIONIC ACID DERIVATIVES
Itaru Mita, Ashiya-shi, Hyogo Prefecture, Nobuo Toshioka, Higashi Yodogawa-ku, Osaka, and Shiro Yamamoto, Higashi Nada-ku Kobe-shi, Japan, assignors to Santen Pharmaceutical Co., Ltd., Osaka, Japan, a corporation of Japan
No Drawing. Filed Sept. 13, 1962, Ser. No. 223,539
Claims priority, application Japan, Nov. 2, 1961, 36/39,905
7 Claims. (Cl. 260—455)

The present invention relates to novel derivatives of mercaptopropionic acid and their preparation and more particularly to α- and β-mercaptopropionylglycine, their amides and esters and intermediates therefor.

The new derivatives are useful as therapeutic agents for the treatment of drug intoxication and poisoning due to mercury and arsenic compounds and have wide application as antidotes and for strengthening liver function while having very low toxicity themselves.

According to the present invention, the mercapto radical of α- or β-mercaptopropionic acid is protected by a substituent which can easily be removed in a succeeding reaction, then halogenated using a conventional haolgenating agent to convert the carboxylic radical to acid halide, condensed with glycine to form the corresponding α- or β-mercaptopropionylglycine derivative, and the protective substituent removed by suitable chemical reaction so that α- or β- mercaptopropionylglycine is obtained.

The reactions are illustrated by the following chemical reactions:

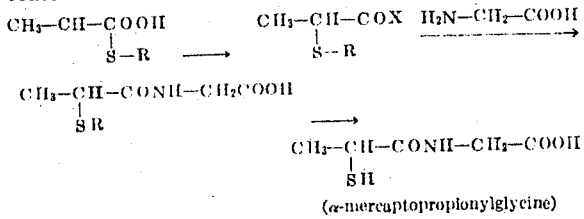

wherein R is a radical readily convertible to hydrogen by suitable reaction and may be, for example,

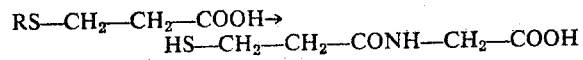

etc. and X is a halogen atom. β- Mercaptopropionylglycine is similarly prepared as follows:

RS—CH$_2$—CH$_2$—COOH→
HS—CH$_2$—CH$_2$—CONH—CH$_2$—COOH

R having the above meanings.

The compounds α- and β- mercaptopropionylglycine exhibit very little toxicity when compared with sulfur-compounds which have been known as antidotes, show remarkable antidotal effect to such poisons as mercury- and organoarsenic compounds, and, in addition, exhibit recovering action for dysfunction of liver and leukopenia caused by administration of drugs, as shown by Tables I, II, and III. The invention offers novel therapeutic agents useful for strengtheing function of liver and as antidotes.

TABLE I.—ACUTE TOXICITY
[given in LD$_{50}$ by intravenous injection in mice]

| | Mg./kg. |
|---|---|
| α-Mercaptopropionylglycine | 2,170 |
| B$_5$Mercaptopropionylglycine | 3,000 |
| Thioctic acid | 197 |
| Thioglycolic acid | 315 |

TABLE II.—ANTIDOTAL EFFECT TO CORROSIVE SUBLIMATE (MERCURY)
[Given as number of test mice which died]

| Hours after administration | 40 mice given 20 mg./kg. of sublimate (Control) | 20 mice given 20 mg./kg. sublimate plus 100 mg./kg. α-mercaptopropionylglycine | 20 mice given 20 mg./kg. sublimate plus 100 mg./kg. β-mercaptopropionylglycine |
|---|---|---|---|
| 1 | 3 | 0 | 0 |
| 3 | 17 | 1 | 1 |
| 5 | 8 | 1 | 1 |
| 24 | 7 | 2 | 6 |
| (Total) | 35/40 | 4/20 | 8/20 |
| Rate of death, percent | 87.5 | 20 | 40 |

TABLE III.—ANTIDOTAL EFFECT TO OXYPHENARSINE (ARSENIC COMPOUND)
[Given in numbers of test mice which died]

| Hours after administration | 20 mice given 30 mg./kg. oxyphenarsine (Control) | 10 mice given 30 mg./kg. oxyphenarsine plus 300 mg./kg. α-mercaptopropionylglycine | 10 mice given 30 mg./kg. oxyphenarsine plus 300 mg./kg. β-mercaptopropionylglycine |
|---|---|---|---|
| 1 | 0 | 0 | 0 |
| 3 | 1 | 0 | 0 |
| 5 | 2 | 0 | 0 |
| 24 | 10 | 0 | 0 |
| (Total) | 13/20 | 0/10 | 0/10 |
| Rate of death, percent | 65 | 0 | 0 |

The following non-limitative examples are illustrative of this phase of the invention.

Example I

α-Benzylmercaptopropionic acid (M. Pt. 76–78° C.; 100 g.) prepared by condensation of α-mercaptopropionic acid with benzyl chloride is allowed to stand overnight with 80 g. of thionyl chloride. After removal of excess thionyl chloride distillation in vacuo gives 70 g. of α-benzylmercaptopropionic acid chloride of B. Pt. 138–139° C./7–8 mm. Hg.

Then, 25 g. of glycine is dissolved in 165 ml. of 2 N sodium hydroxide solution and 70 g. of α-benzylmercaptopropionic acid chloride and 100 ml. of 2 N sodium hydroxide solution are dropped thereinto simultaneously at 3 to 5° C. The solution is then stirred at room temperature for 3 to 4 hours to complete the reaction, the reaction solution is washed with ether, the aqueous layer is acidified with hydrochloric acid, and the resulting crystals are collected by filtration. These are recrystallized from a mixture of methanol and ethyl acetate to give 60 g. of α-benzylmercaptopropionylglycine of M. Pt. 133–134° C.

This α-benzylmercaptopropionylglycine (60 g.) is dissolved in 400 ml. of liquid ammonia, kept at about −50° C., and 12 g. of sodium metal is gradually added thereto. After the reaction, excess ammonia is removed therefrom, the residue is dissolved in water, washed with ether and the residual aqueous layer is adjusted to pH 1 with hydrochloric acid and concentrated in vacuo in a stream of hydrogen sulfide. The crystalline residue is dried and recrystallized from ethyl acetate to give 25 g. of α-mercaptopropionylglycine of M. Pt. 95–97° C.

Analysis calculated from $C_5H_9O_3NS$.—C, 36.80%; H, 5.56%. Found: C, 37.07%, H, 5.65%.

Example II

To 50 g. of β-benzylmercaptopropionic acid (obtained by condensation of β-mercaptopropionic acid with benzyl chloride) is added 40 g. of thionyl chloride, kept overnight, and the product distilled in vacuo to give 46 g. of β-benzylmercaptopropionyl chloride of B. Pt. 150–152° C./7 mm. Hg.

Glycine (16 g.) is dissolved in 220 ml. of 1 N sodium hydroxide solution, kept at approximately 5° C., and 46 g. of β-benzylmercaptopropionyl chloride and 330 ml. of 1 N sodium hydroxide solution are dropped thereinto simultaneously. Then it is treated as in Example I so that 40 g. of β-benzylmercaptopropionylglycine of M. Pt. 115—117° C. is obtained. β-Benzylmercaptopropionylglycine (40 g.) is dissolved in 260 ml. of liquid ammonia, kept at −50° C., and 8 g. of sodium metal is gradually added thereto. After the reaction, excess ammonia is removed, the residue is dissolved in water, the aqueous layer is washed with ether, passed through a column of ion exchange resin of strong acid type to remove sodium, and the aqueous solution is concentrated in vacuo to give a crystalline residue. This is recrystallized from ethyl acetate to give 16 g. of β-mercaptopropionylglycine of M. Pt. 100.5–102° C.

Analysis calculated as $C_5H_9O_3NS$.—C, 36.80%; H, 5.56%. Found: C, 37.12%; H, 5.48%.

Example III

To 21 g. of α-benzoylmercaptopropionic acid (M. Pt. 66.5–67.5° C.; obtained by condensation of a α-mercaptopropionic acid with benzoyl chloride) is added 14 g. of thionyl chloride, kept overnight, excess thionyl chloride removed therefrom in vacuo, and the residue is dissolved in 100 ml. of ether. This is washed with water, dried with sodium sulfate, and is dropped into a solution of 7.5 g. of glycine and 4 g. of sodium hydroxide in 100 ml. of water at 0° C., together with a solution of 4 g. to sodium hydroxide in 50 ml. of water. This is kept overnight, sodium bicarbonate is added thereto, the ethereal layer is washed with water, and the washing is combined with the aqueous layer. This is acidified with hydrochloric acid, cooled, the resulting precipitate is collected and dried, and recrystallized from a mixture of ethylacetate and methanol to give 8 g. of α-benzoylmercaptopropionylglycine of M. Pt. 159.5–160.5° C.

α-Benzoylmercaptopropionylglycine (8 g.) is added to a solution of 9.5 g. of barium hydroxide in 50 ml. of water, heated on a water bath for 4 hours, sulfuric acid is added thereto, then saturated with hydrogen sulfide, the resulting precipitate is removed by filtration, the filtrate is concentrated in vacuo, and the residue is dried and recrystallized from ethyl acetate to give 2 g. of α-mercaptopropionylglycine of M. Pt. 94–97°C.

Example IV

As an Example III, α-p-nitrobenzoylmercaptopropionic acid obtained by condensation of α-mercaptopropionic acid with p-nitrobenzoyl chloride is treated with thionyl chloride, the resulting acid chloride is condensed with glycine, and the obtained α-p-nitrobenzoylmercaptopropionylglycine (M. Pt. 152–153.5°C) is hydrolyzed as in Example III to give α-mercaptopropionylglycine.

Example V

α-Mercaptopropionic acid is condensed with p-nitrobenzyl bromide to give α-p-nitrobenzylmercaptopropionic acid of M. Pt. 91–93.5°C. This is treated with thionyl chloride as in Example III to give the acid chloride and then condensed with glycine to produce α-p-nitrobenzylmercaptopropionylglycine of M. Pt. 148–149° C. This is reduced with sodium metal in liquid ammonia as in Example I to yield α-mercaptopropionylglycine.

The present invention also includes the preparation of α- or β-mercaptopropionylglycineamide comprising the the steps of protecting the mercapto radical of α- or β-mercaptopropionic acid by a subtituent which can be readily removed, halogenating with a conventional halogenating agent to convert the carboxyl radical to the corresponding acid halide, condensing with glycineamide or with a glycine ester, treating with ammonia, and from the resulting S-substituted α- or β-mercaptopropionylglycineamide, removing the substituent by a suitable chemical reaction so that the desired α- or β-mercaptopropionylglycineamide is obtained.

The procedure is illustrated in the following chemical reactions:

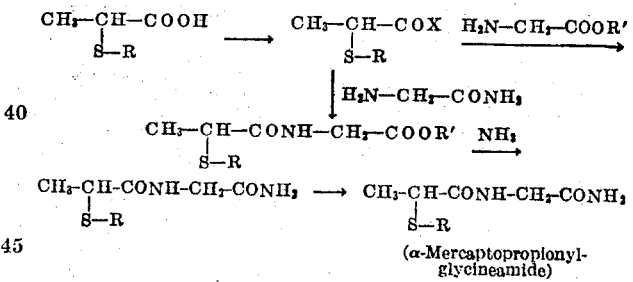

(α-Mercaptopropionylglycineamide)

wherein R is a radical readily convertible to hydrogen such as, for example,

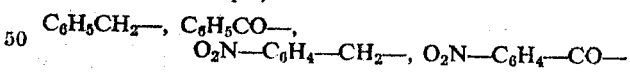

etc., R' is an alkyl radical, and X is a halogen atom. β-Mercaptopropionylglycineamide is similarly prepared as follows:

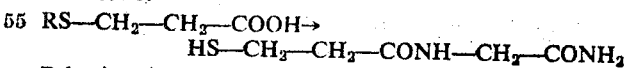

R having the above meanings.

The noval α- and β-mercaptopropionylglycineamides obtained in the present invention show, like the α- or β-mercoptopropionylglycine described above, have little or no toxicity, exhibit remarkable antidotal effects to such poisons as mercury- and arsenic- compounds, and are found to reduce the intoxication symptoms caused by administration of anti-cancer drugs, exposure to radioactive rays or irradiation. These novel therapeutic agents are thus valuable for the purpose of strengthening liver function and for antidotal purposes.

TABLE I. ACUTE TOXICITY (LD$_{50}$)

[Intravenous injection in mice]

| | Mg./kg. |
|---|---|
| α-Mercaptopropionylglycineamide | 1,570 |
| β-Mercaptopropionylglycineamide | 1,790 |
| Thioctic acid | 197 |
| Thioglycolic acid | 315 |

TABLE II.—ANTIDOTAL EFFECT TO CORROSIVE SUBLIMATE
[Given as number of test mice which died]

| Hours after administration | 40 mice given 20 mg./kg. of sublimate (Control) | 20 mice given 20 mg./kg. sublimate plus 500 mg./kg. α-mercaptopropionylglycineamide | 30 mice given 20 mg./kg. sublimate plus 500 mg./kg. β-mercaptopropionylglycineamide |
|---|---|---|---|
| 1 | 0 | 0 | 0 |
| 3 | 8 | 0 | 1 |
| 5 | 24 | 1 | 0 |
| 24 | 8 | 2 | 4 |
| (Total) | 40/40 | 3/20 | 5/30 |
| Rate of death, percent | 100 | 15 | 17 |

TABLE III.—ANTIDOTAL EFFECT TO OXYPHENARSINE (ARSENIC COMPOUND)
[Given as number of test mice which died]

| Hours after administration | 20 mice given 40 mg./kg. of oxyphenarsine (Control) | 20 mice given 40 mg./kg. oxyphenarsine plus 500 mg./kg. α-mercaptopropionylglycineamide | 20 mice given 40 mg./kg. oxyphenarsine plus 500 mg./kg. β-mercaptopropionylglycineamide |
|---|---|---|---|
| 1 | 0 | 0 | 0 |
| 3 | 4 | 0 | 0 |
| 5 | 12 | 0 | 0 |
| 24 | 4 | 0 | 2 |
| (Total) | 20 | 0 | 2 |
| Rate of death, percent | 100 | 0 | 10 |

The following non-limitative examples are illustrative of this phase of the invention.

Example VI

α-Benzylmercaptoproprionic acid (obtained by the condensation of α-mercaptopropionic acid with benzyl chloride) is reacted with thionyl chloride to give α-benzylmercaptopropionic chloride of B. Pt. 133–139° C./7–8 mm. Hg. Glycineamide hydrochloride (31 g.) is dissolved in 150 ml. of water, kept at 2 to 5° C., 360 ml. of 1 N sodium hydroxide solution is added thereto, and 55 g. of the above-obtained α-benzylmercaptopropionic chloride and 270 ml. of 2 N sodium hydroxide solution are dropped thereinto simultaneously. This is stirred at room temperature for 3 to 4 hours to complete the reaction, the resulting crystals are collected, and recrystallized from ethyl acetate yielding 35 g. of α-benzylmercaptopropionylglycineamide (M. Pt. 88–90° C.). This is dissolved in 140 ml. of liquid ammonia, kept at approximately −50° C., 7 g. of sodium metal is added gradually thereto, and reduction reaction carried out. After the reaction, ammonia is removed therefrom, the residue is dissolved in methanol, methanolic hydrochloric acid is added thereto to make slightly acid, the resulting precipitate is removed, the mother liquor is concentrated in vacuo in a stream of hydrogen sulfide and the resulting crystals are recrystallized from a mixture of ethyl acetate and methanol to give 12 g. of α-mercaptopropionylglycineamide of M. Pt. 133–134° C.

Analysis calculated as $C_5H_{10}O_2N_2S$.—C, 37.02%; H, 6.15%; N, 17.27%. Found: C, 36.84%; H, 6.21%; N, 16.83%.

Example VII

Starting from β-mercaptopropionic acid, β-benzylmercaptopropionyl chlorde is obtained as in Example VI. Glycine ethyl ester hydrochloride (3.5 g.) is stirred with 50 ml. of water and 300 ml. of ether, cooled at 0° C., and 53 g. of β-bentzylmercaptopropionyl chloride and 250 ml. 2 N sodium hydroxide solution are simultaneously dropped thereinto. This is stirred at room temperature for more than 3 hours. When the reaction is completed, the ethereal layer is isolated, washed with diluted hydrochloric acid, sodium bicarbonate solution and water, successively, then dehydrated, and the ether removed therefrom to give β-benzylmercaptopropionylglycine ester as a residue. To this is added 150 ml. of methanolic ammonia, kept for about 7 days, and the resulting precipitate recrystallized from methanol to give 35 g. of β-benzylmercaptopropionylglycineamide of M. Pt. 140.5–141–5° C. De-benzylation is carried out as in Example VI using sodium metal in liquid ammonia, ammonia is removed therefrom and alcohol added to the residue. Alcoholic hydrochloric acid is added thereto to make acid to Congo red, the resulting precipitate is collected and eluted with hot anhydrous alcohol. The eluate is cooled and the isolated crystals are pooled with crystals obtained by concentration of the mother liquor. These combined crystals are recrystallized from alcohol to yield 13 g. of β-mercaptopropionylglycineamide of M. Pt. 142–143° C.

Analysis calculated for $C_5H_{10}O_2N_2S$.—C, 37.02%; H, 6.15%; N, 17.27%. Found: C, 36.78%; H, 6.30%; N, 17.04%.

The present invention further relates to procedure for preparing α- and β-mercaptopropionylglycine and amide and ester derivatives thereof, useful not only for prevention and therapy of intoxicating diseases caused by various kinds of heavy metals or intoxicating symptoms caused by administration of anti-cancer drugs or by irradiation of radioactive rays (e.g. leukopenia) but also as antidotes for snake venom such as the venom of *Trimeresurus riukiuanus* and of vipers.

The procedure for preparing α- or β-mercaptopropionylglycine and amide and ester derivatives thereof comprising reacting α- or β-halogenopropionylglycine or amide or ester derivatives thereof with sulfur compounds (which, in the succeeding decomposition reaction, easily form thiol radicals) such as thiobenzoate, thioacetate, alkyl xanthogenate, alkali disulfide, or thiosulfate to produce the corresponding propionylglycine derivative having a sulfur-containing substituent in the α- or β-position and then this is, with or without isolation, effectively decomposed or reduced to give the desired product as illustrated by the following chemical reactions:

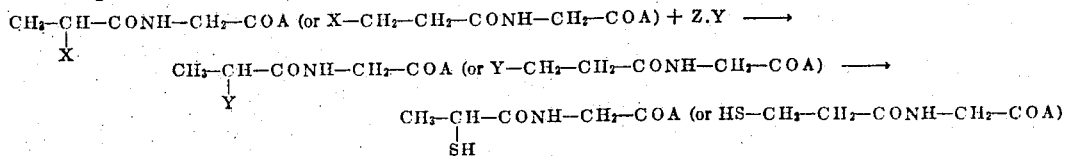

wherein X is a halogen atom, A is selected from a group consisting of the hydroxyl radical (OH), the amino radical ($NH_2$), and an alkyloxy radical (OR), R is an alkyl radical, Y is selected from the group consisting of $C_6H_5COS$, $CH_3COS$, $ROCS_2$, and S—S, and Z is an alkali metal.

The following non-limitative examples are illustrative of this phase of the invention.

*Example VIII*

α-Bromopropionylglycine (10.5 g.) is dissolved in 30 ml. of water and neutralized by the addition of sodium bicarbonate. To this is added a solution of 7.5 g. of thiobenzoic acid and 4.8 g. of potassium carbonate in 50 ml. of water and kept overnight. On the next day, the solution is filtered so that isolated small amounts of insoluble matter are removed, then the filtrate is acidified by addition of hydrochloric acid and the resulting precipitate is collected, washed with water and dried to give 12.8 g. of α-benzoylmercaptopropionylglycine of M. Pt. 158 to 161° C.

The obtained 8.9 g. of α-benzoylmercaptopropionylglycine is suspended in 18 ml. of water and dissolved by neutralizing with sodium bicarbonate. Concentrated ammonia water (9 ml.) is added to this solution, kept overnight and filtered. The separated benzoic acid amide is washed with a small volume of water and this washing is combined with the previously obtained filtrate. From this combined solution excess ammonia water is removed as completely as possible in vacuo, then acidified with hydrochloric acid, concentrated in vacuo to ⅓ its volume and cooled. The isolated crystals are collected by filtration. When dried and recrystallized from ethyl acetate, 2.95 g. of α-mercaptopropionylglycine (M. Pt. 94–96° C.) is obtained.

*Example IX*

α-Bromopropionylglycine (10.5 g.) is dissolved in 30 ml. of ethanol containing 2.8 g. of potassium hydroxide, 4.2 g. of thioacetic acid is added thereto, and allowed to stand at room temperature for 2 days. The precipitated potassium bromide is removed, the filtrate is concentrated in vacuo, ether is added thereto to remove insoluble matters, and the ethereal solution is dried with anhydrous sodium sulfate, evaporated to remove solvent, and kept in a refrigerator with addition of petroleum-ether until crystals form. This is filtered and the recovered crystals are washed with a small volume of ether-petroleum ether and then dried to give 4.2 g. of α-acetylmercaptopropionylglycine melting at 85–87° C. after purification from ethyl acetate.

Then, 4.2 g. of α-acetylmercaptopropionylglycine is dissolved in 30 ml. of 2 N sodium hydroxide solution, heated for 30 minutes, neutralized with hydrochloric acid, and concentrated to dryness in vacuo. The residue is recrystallized from ethyl acetate to yield 1.9 g. of α-mercaptopropionylglycine.

*Example X*

α-Bromopropionylglycine (10.5 g.) is dissolved in 100 ml. of water, neutralized by addition of 4.2 g. of sodium bicarbonate, and is kept overnight with addition of 9.0 g. of potassium xanthogenate. This is filtered, the filtrate is acidified with hydrochloric acid, the resulting precipitate is collected, washed with water, dried, and recrystallized from 30% methanol to give 10.8 g. of α-ethylxanthogenpropionylglycine of M. Pt. 112–113.5° C.

To 8.4 g. of α-ethylxanthogenpropionylglycine is added 80 ml. of concentrated ammonia water at a temperature below 15° C. This is kept for 2 days, then the resulting xanthogenamide is removed by extracting with 50 ml. of ether, nitrogen gas is passed into the residual aqueous solution to remove excess of ammonia, acidified with hydrochloric acid, saturated with sodium chloride, and kept in a refrigerator until crystals appear. These are collected by filtration, dried in a desiccator (phosphorus pentoxide) in vacuo, and recrystallized from ethyl acetate to give 1.7 g. of α-mercaptopropionylglycine.

*Example XI*

α-Bromopropionylglycine (10.5 g.) is dissolved in 15 ml. of water, neutralized with 4.2 g of sodium bicarbonate, and heated on a water-bath with 13.7 g. of sodium thiosulfate (pentahydrate) for 2 hours. This is cooled, hydrochloric acid is added thereto to decompose excess sodium thiosulfate, and filtered. The filtrate is made alkaline with sodium hydroxide and allowed to stand for 2 days. The reaction solution is then diluted with water to make 100 ml. passed through a column of ion exchange resin of strong acid type to remove cations, and concentrated to dryness in vacuo. The crystalline residue is dried and recrystallized from ethyl acetate to give 1.8 g. of α-mercaptopropionylglycine.

*Example XII*

Thiobenzoic acid (7.6 g.) is dissolved in 50 ml. of ethanol containing 3.1 g. of potassium hydroxide, 10.5 g. of α-bromopropionylglycineamide is added thereto, and let stand at room temperature for 2 days. The reaction solution together with the precipitate which forms is concentrated to ⅓ its volume in vacuo, allowed to stand with 50 ml. of water, and the isolated crystals are collected. This is washed with water, dried, and recrystallized from methanol to give 8.6 g. of α-benzoylmercaptopropionylglycineamide of M. Pt. 149–150° C.

This α-benzoylmercaptopropionylglycineamide (8.0 g.) is dissolved in 40 ml. of 20% ammoniacal methanol, and kept overnight. Ammonia and methanol are removed by evaporation in vacuo the next day, the residue is dissolved in water, filtered, and insoluble matter washed with water. The washing is combined with the filtrate, concentrated to dryness in vacuo, the residue dried and recrystallized from a mixture of ethyl acetate and methanol to give 2.2 g. of α-mercaptopropionylglycineamide of M. Pt. 133–130° C.

*Example XIII*

Glycine (3.8 g.) is dissolved in 50 ml. of 1 N sodium hydroxide solution and 8.5 g. of β-bromopropionylchloride and 25 ml. of 2 N sodium hydroxide solution are dropped thereinto simultaneously at 3 to 5° C. The solution is then stirred at room temperature for 3 to 4 hours. To this resulting solution is added a solution of 7.5 g. of thiobenzoic acid and 4.8 g. of potassium carbonate in 50 ml. of water and kept overnight. On the next day, the solution is filtered, then the filtrate is acidified by addition of hydrochloric acid and the resulting precipitate is collected, washed with water and dried to give 11.4 g. of β-benzoylmercaptopropionylglycine of M. Pt. 129 to 130.5 C.

The obtained 8.0 g. of β-benzoylmercaptopropionylglycine is dissolved in 5 N sodium hydroxide solution, heated for one hour, neutralized with hydrochloric acid and concentrated to dryness in vacuo. The residue is recrystallized from ethyl acetate to yield 2.5 g. of B-mercaptopropionylglycine.

*Example XIV*

As in Example XIII, β-benzoylmercaptopropionylglycineamide (M. Pt. 132–134° C.) is obtained from β-bromopropionylchloride, glycineamide and thiobenzoic acid. This β-benzoylmercaptopropionylglycineamide is hydrolized as in Example VII to give β-mercaptopropionylglycineamide.

*Example XV*

Thiobenzoic acid (7.6 g.) is dissolved in 50 ml. of ethanol containing 3.1 g. of potassium hydroxide, 11.9 g. of α-bromopropionylglycine ethyl ester is added thereto, and kept overnight. The precipitated potassium bromide is removed by filtration the next day, the filtrate is concentrated in vacuo, and residual oil is dissolved in ether. This is washed with water, an aqueous solution of sodium bicarbonate and water, successively, then dried with anhydrous sodium sulfate, and the ether removed by evaporation. When petroleum benzene is added thereto and allowed to stand, crystallization occurs and the crystals are collected by filtration and washed with a mixture of ether and petroleum benzene to give 13.2 g. of α-benzoylmercaptopropionylglycine ethyl ester which melts at 75–77° C. when recrystallized from 60% ethanol.

This α-benzoylmercaptopropionylglycine ethyl ester (8.9 g.) is dissolved in 100 ml. of liquid ammonia, let stand for about 60 hours, and the ammonia removed therefrom. The resulting crystals are dissolved in water to remove insoluble benzoic acid amide, and the filtrate is concentrated to dryness in vacuo. The residue is recrystallized from a mixture of ethyl acetate and methanol to give 1.8 g. of α-mercaptopropionylglycineamide.

From the ethyl acetate-insoluble part, 3.5 g. of bis-(α-mercaptopropionylglycineamide) (M. Pt. 165–167° C.: oxide type) is obtained as a side product.

*Example XVI*

As in the Example XV, 12 g. of β-benzoylmercaptopropionylglycine ethyl ester (M. Pt. 69–71° C.) is prepared starting from 11.9 g. of β-bromopropionylglycine ethyl ester.

This β-benzoylmercaptopropionylglycine ethyl ester (7.4 g.) is mixed with 8.5 g. of barium hydroxide (octahydrate), 50 ml. of water, and 30 ml. of ethanol, and heated in a nitrogen stream on a water-bath at 70–80° C. for 8 hours. After cooling, the solution is acidified with dilute sulfuric acid, and the precipitated barium sulfate is collected by filtration and washed with water. The washing is combined with the filtrate and concentrated to dryness in vacuo. The residue is dried in a desiccator (phosphorus pentoxide) in vacuo and recrystallized from ethyl acetate to give 1.5 g. of β-mercaptopropionylglycine ethyl ester of M. Pt. 101–103° C.

By air-oxidation of the crude product, 1.3 g. of bis-(β-mercaptopropionylglycine) (M. Pt. 197–199° C.) is obtained as a side product.

*Example XVIII*

A mixture of 6.5 g. of sodium sulfide (nonahydrate) and 0.9 g. of flower of sulfur is dissolved in 30 ml. of water by heating on a water-bath, an aqueous solution of the sodium salt of β-bromopropionylglycine (prepared from 10.5 g. of β-bromopropionylglycine, 4.2 g. of sodium bicarbonate, and 20 ml. of water) is added thereto, and heated on a water-bath for 2 hours. A small amount of insoluble matter is removed by filtration the next day and the filtrate is made acid with hydrochloric acid to give 6.8 g. of bis-(β-mercaptopropionylglycine), which melts at 197–199° C. after recrystallization from water.

This bis-(β-mercaptopropionylglycine) (6.5 g.) is suspended in 65 ml. of water, dissolved by neutralizing with addition of 3.4 g. of sodium bicarbonate, aluminum amalgam prepared from 6 g. of aluminum leaves is added thereto, heated gradually, and stirred at 80–90° C. for 1.5 hours. After cooling, the precipitate is collected by filtration and washed with water. This washing is combined with the filtrate, concentrated to dryness in vacuo, and the residue is dried and recrystallized from ethyl acetate to give 4.2 g. of β-mercaptopropionylglycine.

*Example XVIII*

A mixture of 6.5 g. of sodium sulfide (nonahydrate) and 0.9 g. of flower of sulfur is dissolved in 65 ml. of 80% ethanol under heating, 11.9 g. of β-bromopropionylglycine ethyl ester is added thereto, and heated to reflux on a water-bath for 2 hours. A small amount of insoluble matter is removed by filtration the next day, ethanol is evaporated from the filtrate in vacuo, and allowed to stand so that isolated oil is solidified. This is filtered, washed with water and a small volume of ethanol, and dried to give 6.4 g. of bis-(β-mercaptopropionylglycine ethyl ester), which melts at 120–121° C. when recrystallized from ethanol.

This bis-(β-mercaptopropionylglycine ethyl ester) (6.4 g.) is dissolved in 100 ml. of 20% ammoniacal methanol, kept at room temperature for 5 days, concentrated, and the resulting crude crystals (5.4 g.) are recrystallized from water to give 4.8 g. of bis-(β-mercaptopropionylglycineamide) (M. Pt. 223–225° C.).

This bis-(β-mercaptopropionylglycineamide) (4.8 g.) is suspended in 100 ml. of 50% acetic acid, and stirred with 2.1 g. of zinc dust at room temperature for 4 hours. The next day, hydrogen sulfide is passed into the solution to remove zinc, filtered, the filtrate concentrated to dryness in vacuo, and the residue dried in a desiccator (phosphorus pentoxide; in vacuo) and recrystallized from anhydrous ethanol to give 3.2 g. of β-mercaptopropionylglycineamide of M. Pt. 142–143.5° C.

What is claimed is:

1. A mercaptopropionic acid derivative selected from the group consisting of $CH_3CHR$—$CONHCH_2COA$ and $CH_2R$—$CH_2CONHCH_2COA$ in which R is selected from the group consisting of $SCOCH_3$ and $SCOC_6H_5$ and A is selected from the group consisting of OH and $NH_2$.
2. α-Mercaptopropionylglycine.
3. β-Mercaptopropionylglycine.
4. α-Mercaptopropionylglycineamide.
5. β-Mercaptopropionylglycineamide.
6. α-Acetylmercaptopropionylglycine.
7. α-Benzoylmercaptopropionylglycine.

References Cited by the Examiner

Greenstein, Chemistry of the Amino Acids, vol. 3, pp. 1077–1092 (1961).
Reid, Organic Chemistry of Bivalent Sulfur, vol. 1, pages 21–29 (1958).
Wagner, Synthetic Organic Chemistry, page 566 (1953).

LORRAINE A. WEINBERGER, *Primary Examiner.*
DANIEL D. HORWITZ, LEON ZITVER, *Examiners.*

UNITED STATES PATENT OFFICE
CERTIFICATE OF CORRECTION

Patent No. 3,246,025                        April 12, 1966

Itaru Mita et al.

It is hereby certified that error appears in the above numbered patent requiring correction and that the said Letters Patent should read as corrected below.

Column 4, lines 36 to 46, the reaction mechanism should appear as shown below instead of as in the patent:

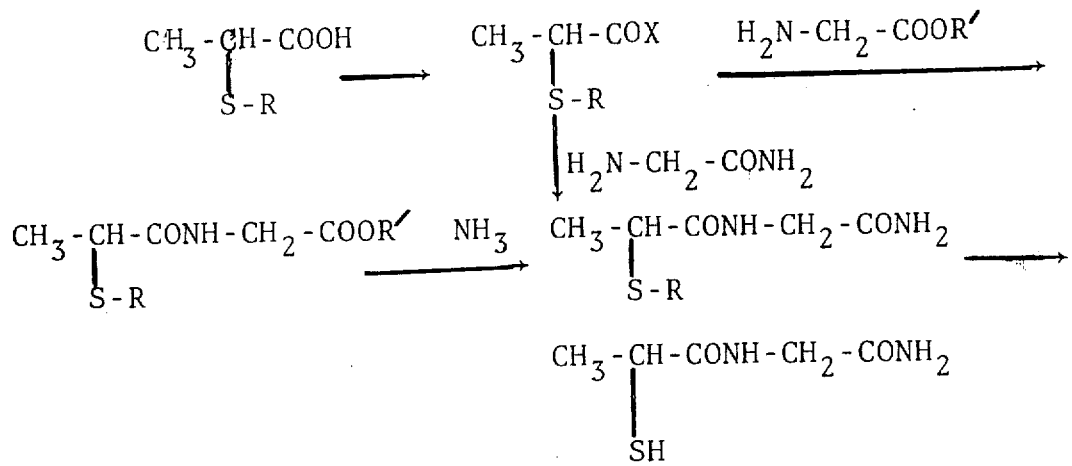

(α-Mercaptopropionylglycineamide)

Signed and sealed this 7th day of February 1967.

(SEAL)
Attest:

ERNEST W. SWIDER                              EDWARD J. BRENNER
Attesting Officer                               Commissioner of Patents